United States Patent [19]
McDonald

[11] Patent Number: 5,133,145
[45] Date of Patent: Jul. 28, 1992

[54] LIGHTED SUBMERSIBLE FISH ATTRACTING DEVICE

[76] Inventor: David E. McDonald, 3111 Clinton, Longview, Tex. 75604

[21] Appl. No.: 679,178

[22] Filed: Mar. 26, 1991

Related U.S. Application Data

[63] Continuation-in-part of Ser. No. 470,384, Jan. 26, 1990, abandoned.

[51] Int. Cl.⁵ .............................................. A01K 85/00
[52] U.S. Cl. .................................................... 43/17.5
[58] Field of Search ................................. 43/17.5, 55

[56] References Cited

U.S. PATENT DOCUMENTS

| | | | |
|---|---|---|---|
| 373,333 | 11/1887 | Brosch | 43/17.5 |
| 636,694 | 11/1899 | Pflueger | 43/17.5 |
| 1,876,692 | 9/1932 | Kornsweet | 43/17.5 |
| 2,898,698 | 8/1959 | Bair | 43/17.5 |
| 3,079,721 | 3/1963 | Smith | 43/17.5 |
| 3,091,882 | 6/1963 | Dudley | 43/17.5 |
| 3,177,604 | 4/1965 | Ewing | 43/17.5 |
| 3,510,978 | 5/1970 | Murdock | 43/17.5 |
| 3,617,733 | 11/1971 | Adams | 43/17.5 |
| 4,020,580 | 5/1977 | Chappell | 43/17.5 |
| 4,475,301 | 10/1984 | Wortham | 43/17.5 |
| 4,569,146 | 2/1986 | Lowrence | 43/17.5 |
| 4,858,372 | 8/1989 | Ray | 43/17.5 |

Primary Examiner—Kurt Rowan
Attorney, Agent, or Firm—Charles C. Garner

[57] ABSTRACT

A lighted, submerable fish attracting device is provided for attracting fish from greater distances and for rapidly concentrating them around the bait. The device uses encapsulated live bait under a combined lighting arrangement from a light source. The combined direct spotlighting of the baitfish, and brilliant reflected floodlighting of a broad area, provides brilliant visibility and attraction from afar, concurrently with centralized attraction and focusing around the baitfish. The device provides underwater dynamic vertical plumb stabilization for improved dynamic handling and for elimination of tumbling during rapid submersion under water. The device provides handle-to-powercord attachment means, linear depth measurement marks on the powercord, and the direct usage as a minnow bucket, as a handheld spotlight, and as a floating utility light, thus eliminating the need for separate pieces of equipment such as buckets, spotlights and other accessories for those essential support functions for nighttime fishing.

11 Claims, 2 Drawing Sheets

LIGHTED SUBMERSIBLE FISH ATTRACTING DEVICE

This is a continuation-in-part of U.S. Pat. No. 07/470,384, filed Jan. 26, 1990, now abandoned.

TECHNICAL FIELD

This invention pertains to fishing equipment, and more particularly to an improved fish attracting device that attracts fish from greater distances and centralizes them around spotlighted baitfish in a floodlighted arena. The device holds live bait under combined spotlight and floodlight illumination. The device is equipped with underwater dynamic stabilization to eliminate tumbling, and provides other functional advantages, to attract fish and collect them where the fisherman may use fish hooks and other conventional means for catching them.

BACKGROUND OF INVENTION

For a number of years, technology has been available for building submersible fish attracting devices with a light. They have consisted of various means of submerging a container holding bait under a light. The basic principal, well known to fishermen, is that game fish at night will be attracted to a light and to baitfish, and may thus be enticed to a location where conventional fishing equipment is used to catch them.

Although such prior devices have theoretically provided fish attraction, they have used only a small light on the baitfish alone, which fails to provide any practical range of distant attraction. Devices for lighting large areas of the lake have failed to provide centralized attraction and focus of the game fish to a point where the fish hooks are located.

Such devices have not been vertically stabilized under water, with the result that they have been clumsy to handle, having an undesirable tendency to wobble and tumble when rapidly submerged, moved or relocated under water. They have required auxiliary buckets, spotlights, and other support equipment for night fishing. This Applicant has not found any such prior devices commercially available on the market for fishing equipment today.

BRIEF SUMMARY OF THE INVENTION

This invention provides an improved lighted, submersible device that attracts fish from greater distances and rapidly centralizes and focuses them around the baitfish. The device holds encapsulated live bait under a combined lighting arrangement, providing both direct spotlight and oppositely reflected floodlight. The floodlighting of a large area provides long range visibility and attraction from afar. After game fish are attracted from distances and brought into the large, brilliantly floodlighted area, they would otherwise tend to wander aimlessly about within the outer penumbra of the floodlight, but the brilliant spotlighting of this invention beamed directly onto the sparkling backs of the live baitfish, provides flashing visibility that further attracts them to the focal point of the fishing device. The direct spotlighting of the bait provides focal attraction and centralization.

The device is dynamically stabilized vertically under water, by coupled, upward buoyancy and downward counterweight, to provide improved handling and to eliminate tumbling during rapid submersion. This fish attracting device functions directly as a minnow bucket for handling, transporting and storage of live bait; it functions directly as a hand-held utility light for fishing and camping; and it functions directly as a floating fishing light for utility purposes; thus eliminating the need for separate pieces of equipment for those essential functions for fishing. The powercord is used as the tether and lifting cord for raising and lowering to depths in water. The lifting stresses are transferred directly from the lifting cord to the structure of the device by handle-to-powercord attachment means. During submersion, the depth of the device is directly readable at any time by visual reference to the linear depth measurement marks along the surface of the powercord.

BRIEF DESCRIPTION OF THE DRAWINGS

A more complete understanding may be had under the Detailed Description of the Invention by reference to the accompanying Drawings, wherein:

FIGS. 1 and 2 show a hinged access door for insertion and removal of baitfish. FIGS. 3 and 4 show an alternate embodiment in which access is achieved by removing the top;

FIG. 4 is a cross-sectional side view of the device of FIG. 3, showing how light rays from the spotlight are directed onto the baitfish and onto the opposite and apart reflector, and how such reflector provides oppositely reflected floodlighting for the surrounding area.

DETAILED DESCRIPTION OF THE INVENTION

Figures 1, 2:
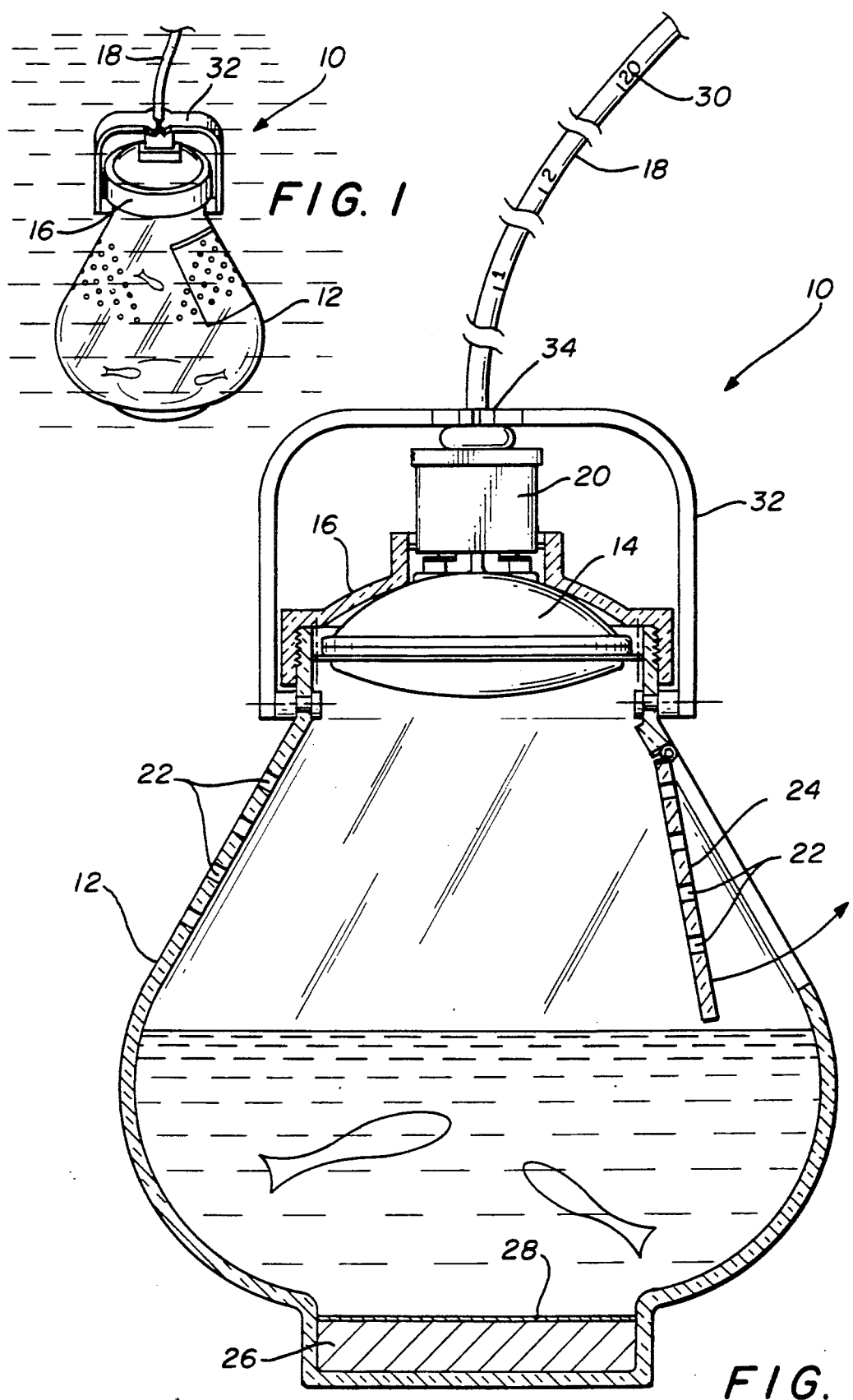
FIGS. 1 and 3 are overall, perspective views of alternate, equivalent embodiments of the invention, shown in operating position, lighted, loaded with minnows, and submerged in water for attracting fish.
FIGS. 2 and 4 are each respectively a cross-sectional side view of the embodiments of FIGS. 1 and 3.

Referring now to the Drawings, please notice that like reference numbers in each of the FIGS. 1-5 are used to designate like, corresponding or equivalent parts throughout all five views.

Figure 3:
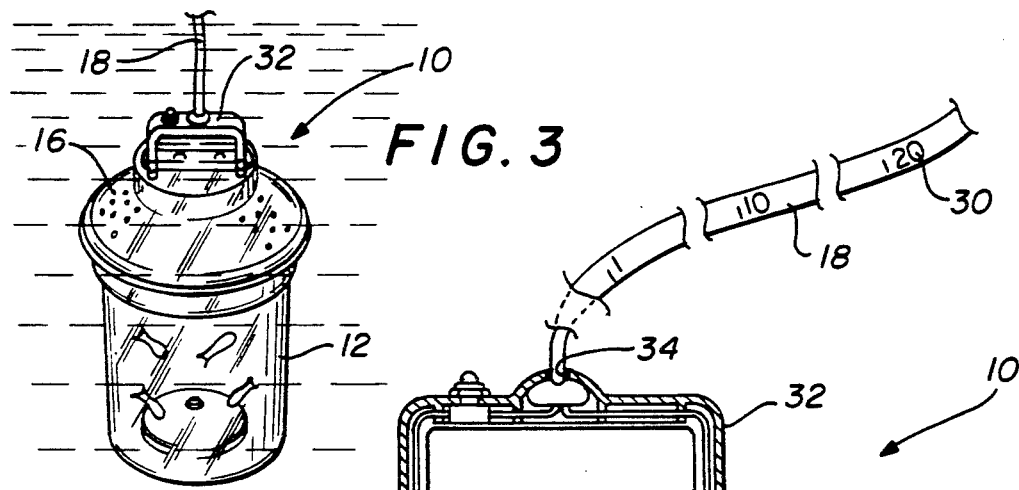

FIGS. 1 and 3 illustrate alternate embodiments which are substantially equivalent, with each illustration showing the fish attracting device 10, lighted, loaded with live minnows, and submerged in water to a given depth for attracting and focusing fish in a manner in which this apparatus is to be used. Each view shows the container 12, the lid 16, the powercord 18, and the handle 32.

GENERAL ARRANGEMENT AND CONSTRUCTION

Figure 4:
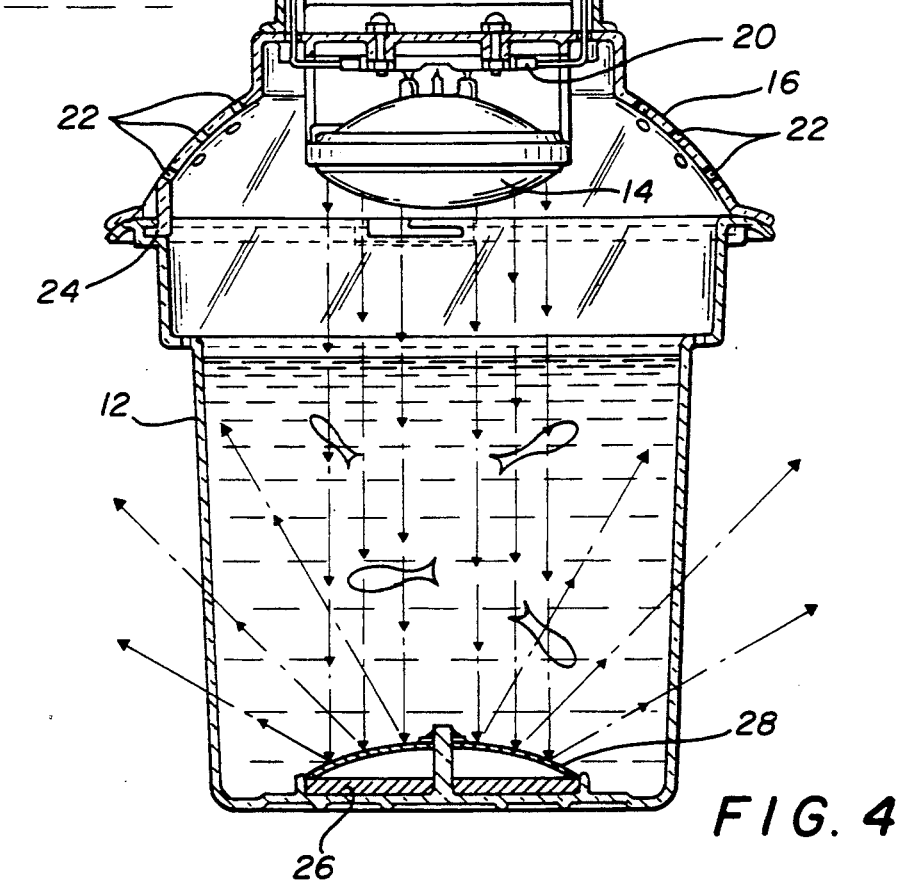

FIGS. 2 and 4 each show the fish attracting device 10, which comprises a container 12 equipped with a sealed beam electric light 14, and light attaching means 16. The container 12 and light attachment means 16 of both FIGURES are made of transparent lucite plastic material or any equivalent transparent and durable structural materials well known to persons of ordinary skill in the art of manufacturing fishing lures. Electric power is supplied to the light 14 through a powercord 18, which is connected by cord-to-light connecting means 20. The container 12 and light attachment means 16 are equipped with one or more water apertures 22 of predetermined size for permitting free flow, entry and exit of water while preventing the escape of live baitfish. The container 12 is equipped with access means 24 for insertion and removal of bait.

Figure 5:
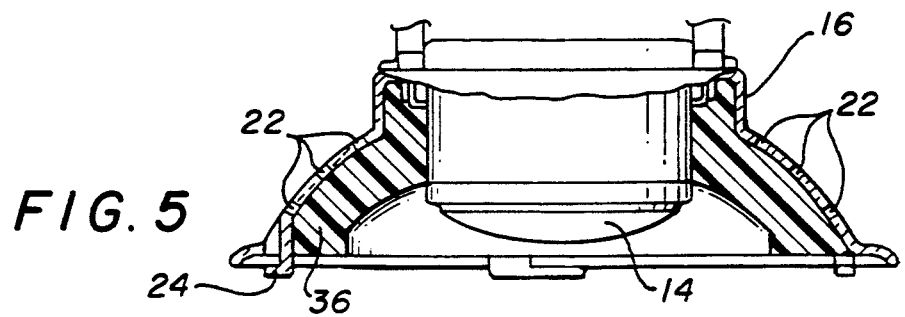
FIG. 5 is a sectional side view of the top of the container in an alternate embodiment in which the removable top is fitted with flotation materials, for use as a floating fishing and utility light.

In FIGS. 3, 4, and 5, the lid 16 serves as a means for attaching the light 14 to the top of the container 12. In FIGS. 1 and 2, the access means 24 is shown as a hinged door 24. In FIGS. 3 and 4, the access means 24 is shown as a selectively openable and closable, twist-fit, interrupted thread, interlocking cam connection 24, between lid 16 and container 12, which is shown in FIGS. 3 and 4 in the closed position. The lid 16 may be removed by twist disengagement of the interrupted threads, for access, insertion and removal of bait from the container 12.

SPECIAL ARRANGEMENT AND CONSTRUCTION

FIGS. 2 and 4 show the special arrangement of components to achieve the improvements of this invention.

COMBINED LONG RANGE ATTRACTION AND FOCAL CENTRALIZATION

This invention comprises combined direct spotlighting and reflected floodlighting means for both spotlighting the bait and floodlighting the surrounding area. The floodlighting of the area achieves brilliant long range attraction from great distances, and concurrently the spotlighting of the baitfish centralizes and focuses the game fish around the baitfish.

In the container 12, as shown in both FIGS. 2 and 4, the floodlight reflector means 28 is located some distance apart, separately and substantially opposite from the sealed beam spotlight 14. The reflector 28 receives directly the spotlight beam from light 14 and provides oppositely reflected floodlighting of the bait, backwardly, upwardly and outwardly to floodlight the area. The reflector 28 as shown in FIG. 4 is dome shaped, but can equivalently be convex, and it can also be flat as shown in FIG. 2. The floodlight reflector means 28 is made of bright reflective material such as aluminum, stainless steel, mirrored glass, brightly painted surface, or other reflective materials well known to persons of ordinary skill in the art of manufacturing lights and reflectors, and is shown here of preferred smooth surface, but may equally be multifaceted and may equally be of sparkling surface. The reflector 28 is in position directly to receive the light beam from spotlight 14, whereby the direct beam of the spotlight on the baitfish is reflected and converted into floodlighting, back onto the bait and throughout the container and the surrounding area, brilliantly spreading the illumination.

HANDLE-TO-POWERCORD CONNECTION MEANS

The device 10 of FIGS. 1-5 is equipped with handle means 32 extending upwardly and over the top of the container 12 for handling, lifting and transport of the device 10. The powercord 18 is shown in FIG. 2 running upwardly through a hole 34 in said handle 32. The powercord 18 is used, not only as the conductor of electric power for the light 14, but also as the tether and lifting cord for raising, lowering and lifting the device 10 into and out of the water and to depths. The handle means 32 is positively attached to the powercord 18 by handle-to-powercord attaching means 34 for assuring that, when the device 10 is manually lifted or lowered by the powercord 18, the lifting stresses are conveyed through the handle 32 to the container 12 and not onto the cord-to-light connection 20. FIGS. 1 and 3 each show a perspective view of the handle means 32, extending upward and over the lid 16, with the powercord 18 extending vertically through a hole 34 in the center of the handle 32. In FIGS. 1 and 2, the handle-to-powercord connecting means 34 comprises a slotted hole 34 in the center of the top of the handle 32, into which the powercord 18 is frictionally pressed laterally, through the slot into the slotted hole 34. A fixed button, spacer or knot is rigidly affixed to the powercord 18 immediately below the slotted hole 34. In this manner, the powercord 18 cannot be moved upwardly through the hole 34 in the handle 32. A small amount of excess, loose powercord 18 must be provided between the handle-to-powercord attachment means 34 and the cord-to-light connecting means 20 to provide sufficient vertical slack to accommodate any upward deflection of the handle 32 during lifting or handling of the device 10. In an alternate embodiment, as shown in FIGS. 3 and 4, the slot may be omitted from the hole 34; the powercord during manufacturing and assembly is fed vertically into and through the hole 34; and the fixed button, spacer or knot is then rigidly affixed to the powercord 18 immediately below the hole 34 in the handle 32, in the manner described above, with equivalent results.

DEPTH MEASUREMENT MEANS

The powercord 18, as shown in both FIGS. 2 and 4, is used not only as the tether and lifting cord for raising and lowering the fish attracting device into and out of the water, but is equipped with depth measurement means 30 for measuring the depth to which the device has been submerged. The depth measurement means is shown here in FIG. 4 as linear measurement marks 30, permanently marked on the surface of the cord by any conventional means of marking such as printing, stamping, painting, or casting, to measure linear distance from the top of the container 12 to show the depth to which the fish attracting device 10 is submerged in water.

UNDERWATER VERTICAL STABILIZATION

As shown in FIGS. 1-4, underwater dynamic stabilization vertically is achieved by coupling buoyant upward thrust in the top with distinct downward thrust of counterweight in the bottom.

Dynamic underwater stabilization of this invention is a major improvement over prior fish attracting devices, which will improve handling and facilitate rapid, efficient control under water, during adjustment of the depth, and during relocation of the fish attracting device 10 in nighttime fishing operations.

To achieve dynamic vertical stabilization under water, the device 10 is manufactured substantially as shown in FIGS. 2, or alternately and equivalently as shown in FIG. 4. The vacuum sealed bulb light 14 must be selected as a predetermined size for distinct buoyancy proportional to the size of the overall device; and must be fixed substantially at the top of lid 16 as shown in FIGS. 2 and 4. This imparts to the container an upwardly balancing thrust, whereby the top of the device under water is biased in the upward direction. The counterweight 26 must be selected as a predetermined, proportional weight, size and shape to positively and distinctly balance and overcome the buoyancy of the bulb 14. The counterweight 26 must be fixed substantially at the bottom as shown in FIGS. 2 and 4, apart and opposite from the vacuum sealed bulb light 14. This imparts to the container a distinct, downwardly balancing thrust and bias in the downward direction.

The bulb 14 and the counterweight 26 will be located apart and opposite each other in the vertical plane. The distance apart of the bulk 14 and the counterweight 26 provides the couple, moment arm and balance under water for the upward buoyancy and downward thrusts, thus biasing the combined device rapidly to seek, return and remain in the true vertical position. The distance apart of the bulb 14 and the counterweight 26 should be approximately fifty percent greater than the diameter of the container, although, depending on the shape of the container, experimentation under water relative to the proportional size, shape and distance apart will provide the optimum arrangement. The combined effect of coupled and balanced, buoyant upward bias on the top and counterweighted downward bias on the bottom, located apart vertically, achieves excellent underwater plumb bob stability.

MINNOW BUCKET MEANS

The container 12, as shown in FIGS. 2 and 4, is only partially filled with water, as would be the situation when inserting or removing live minnows or other bait through the access means 24, and before the fish attracting device is submerged. When not submerged, as while loading with bait, or while transporting it, or while letting it stand by on the dock or in the boat, any excess water above the level of the lower apertures 22 would escape or run out by flow of gravity; but an ample supply of water will remain in the bottom portion of container 12, thus permitting the device 10 to be used efficiently and directly as a minnow bucket and live bait container for handling live bait above water, for storage in water, and for retention and transporting from place to place, without the need for converting or adapting the device, and without the need for a separate bucket or other auxiliary equipment. To achieve this capability, the device must be arranged and constructed substantially as shown in FIG. 2 and equivalently as shown in FIG. 4. The container 12 is stabilized with a substantially flat, preferably counterweighted bottom as per counterweight 26 of FIG. 4 for stability in setting it on horizontal surfaces, so that it can stand alone, well balanced without tipping over. In FIG. 4 the bottom is shown flat, but if the container itself is not flat on the bottom, it may equally be provided with a flat base, and may equally be provided with a stand, as well as with legs, with equivalent results. The container must retain a volume of water of preferably fifty percent or more of the total volume of the container 12, below the aperture holes 22 and access means 24, to keep a quantity of minnows alive; the access means 24 must provide quick, easy and efficient upper loading to the container 12, above the water line of the baitfish, for deposit and removal of live bait, so that baitfish water will not flow out of the container when the access means is opened; and the handle must be constructed and attached well above the center of gravity of device 10, per handle means 32 as shown in FIGS. 2 and 4, for efficient ease of handling, transport and control of the device 10. These characteristics must be built directly into the structure of the device 10 without requiring modification, rearrangement or adaptation of the device and without auxiliary equipment.

HAND-HELD SPOTLIGHT MEANS

In the embodiment of FIGS. 4 and 5, the lid 16 is arranged to include the spotlight 14, the handle 32, the powercord 18, and the handle-to-powercord attachment means 20 in a unitized light and lid assembly 16, completely detachable from the bottom half of the container. The handle 32 must be ridgidly attached in a manner similar to FIGS. 2 and 3 which will assure positive control of the light and will permit it to be efficiently aimed and freely directed, up, down, horizontally and vertically, and in any direction, apart from the container 10. In this detached condition, the lid assembly 16 must ridgidly contain the light 14; the beam of light 14 must not be obstructed, and must be in position to shine the light in any direction in which the lid assembly may be pointed. In this detached condition, the lid 16 assembly is separately portable and used efficiently and directly by the fisherman as a hand-held spotlight for general utility purposes during overall fishing and camping activities, without any need for conversion, modification or adaptation of the device, and without auxiliary equipment.

FLOATING FISHING AND UTILITY LIGHT

In the FIG. 5 alternate embodiment, the light and lid assembly 16, being a unitized assembly, detachable and portable, apart from the bottom half of the device, will be fitted with flotation materials 36. The flotation materials 36 are of size and buoyancy sufficiently to float the light and lid assembly 16 in water. The flotation material 36 must be attached to the light and lid assembly 16 at a balancing location, preferably well above the submerged center of gravity of the combined light and lid assembly 16 when submerged in water, substantially as shown, to cause the light and lid assembly 16 to float in the upright position, with the spotlight beam directed in the downward position. In FIG. 5, the flotation material is attached within the neck of the lid 16, but it may equally be located and attached outside the lid 16. The flotation material 36 is made of styrofoam, cork, air filled tubing, or other equivalent flotation materials well known to persons of ordinary skill in the art of fishing lure manufacturing. In this embodiment, the light and lid assembly 16 may be used directly as a floating fishing and utility light.

NECESSARY SUPPORT FUNCTIONS FOR FISHING

In practice, the ability to use the fish attracting device directly as a minnow bucket, and as a hand-held utility light, and as a floating fishing and utility light, in addition to fish attracting, without modification or adaptation of the device and without auxiliary equipment, has been found to be a great advantage to the fisherman. This eliminates the need for separate pieces of equipment such as a bucket and a spotlight, and other extra parts for those necessary support functions for night fishing, thus saving considerable expense, weight, bulk, time and work.

INSTRUCTIONS FOR USE

In normal use, the fisherman will first place the fish attracting device 10 in a vertical position, open the access means 24 and load the container 12 by placing approximately one dozen or more live minnows or other bait with a quantity of water into the container 12 to raise the level of the water near the level of the lower apertures 22 or near the bottom of the access means 24. After closing the access means 24, the fish attracting device 10 is ready for use. At this point, using the handle means 32 for lifting, transporting and handling, the device 10 will be efficiently used as a minnow bucket or live bait container in the conventional manner, to transport the loaded device to the fishing location. The fish attracting device 10 will be placed into the water, allowed to submerge and manually lowered by use of the powercord 18 to the desired depth as measured by the depth measurement marks 30. During the lowering operation, fish attracting devices will contain air and are clumsy to move, and would otherwise tumble, wobble, and be difficult to position while being submerged. But the underwater plumb bob stability of the instant apparatus will be a great advantage to the fisherman in rapid and efficient lowering and relocation of the device 10.

At this point in the fishing procedure, the fisherman will most often have used a commercially available depth finder, or will have received advice and information from other fishing instruments or experts, to determine at what depth the game fish are located. Thus it will be highly desirable to locate the fish attracting device of this invention at a precise depth. The depth to which this device 10 is lowered or submerged in the water may be read directly at any time by visual reference to the linear depth measurement marks 30 on the powercord 18.

When in place, at a given depth in the water the live, captive, encapsulated baitfish are brightly illuminated by the direct spotlight source 14, and a large surrounding area is brilliantly floodlighted by the reflector 28. By the combined spotlighted sparkling baitfish and the brilliantly floodlighted surrounding area, the range of attraction of the light 14 is greatly enlarged and focused.

ESSENTIAL COMBINATION OF LIGHTING

Please notice that spotlighting of the baitfish alone will not attract fish from great distances but will be visible only within the localized vicinity of the spotlight; and likewise, floodlighting of a large area alone will not localize the game fish around the fishhooks, but will permit them to wander aimlessly around within the outer penumbra of the floodlight. Only this invention, which combines both spotlighting of the sparkling bait, and reflective floodlighting of a large area, will provide both attraction from afar and immediate concentration around the baitfish.

After test usage and experience, it has been said that when this spotlight/floodlight fish attracting device has been placed into the water at night, every fish in the lake will know about it.

Although the invention has been illustrated in alternative embodiments of the accompanying Drawings, and as described in the foregoing Detailed Description, it will be understood that the invention is not limited to the embodiments disclosed, but is capable of numerous equivalent arrangements without departing from the spirit of the invention.

What I claim is:

1. A light submersible fish attracting device with handle-to-powercord attachment means, comprising;
   (a) a transparent, submersible container substantially closed for holding live bait;
   (b) said container having upper and lower portions, access means for inserting and removing bait, and water flow means of size and shape for exit and entry of water while preventing the escape of live bait;
   (c) lighting means attached to said container for illuminating the bait and interior of said container;
   (d) electric powercord connected to said lighting means and connectable to an external power source;
   (e) handle means attached to said upper portion for lighting, handling, and carrying said device; and
   (f) handle-to-powercord attachment means for transferring the lifting stresses from said powercord through said handle means, to said container, when said device is lifted by said powercord.

2. A light submersible fish attracting device according to claim 1, further comprising;
   (g) said powercord being marked along its length with linear depth measurement means for determining the depth of submersion of said device directly by reference to said means on said cord.

3. A lighted submersible fish attracting device with underwater plumb stabilization, comprising:
   (a) a transparent submersible container substantially closed for holding live bait;
   (b) said container having upper and lower portions, access means for inserting and removing bait, and water flow means of size and shape for exit and entry of water while preventing the escape of live bait;
   (c) lighting means attached to said container for illuminating the bait an interior of said container;
   (d) electric powercord connected to said lighting means and connectable to an external power source;
   (e) handle means attached to said upper portion for lifting, handling, and carrying said device; and
   (f) underwater plumb means for causing said device to distinctly seek and maintain a plumb, upright position at right angle to the plane of the horizon during submersion and relocation in water, comprising:
   buoyant means, of size and amount of upward thrust, proportional to size of said container, for opposing and balancing the weight of walls and structure of said device when submerged in water;
   said buoyant means being located in the top of said upper portion, above the center of said device;
   counterweight means, being a ballast weight in addition to the weight of walls and structure of said device, and being of size, weight, and downward thrust, for counterbalancing and overcoming said buoyant means and for imparting a distinct downward thrust to said device;
   said counterweight means being located in the bottom of said lower portion, below the center of said device; and
   separation of said buoyant means location and said counterweight means location, apart and opposite from each other in a vertical plane passing through the center of said device, by a distance apart such that, when said device is submerged and not in a plumb position, said distance apart of upward thrust and downward thrust provides a force couple and moment arm, substantially about the center of said device for distinctly returning said device to true upright position and keeping it plumb.

4. A light submersible fish attracting device according to claim 3 whereon said buoyant means comprises a vacuum sealed light bulb.

5. A fish attracting device according to claim 3, further comprising;
   support means for stable, free standing support of said device in an upright position on a horizontal surface when loaded with water and baitfish;
   said lower portion of said container being substantially closed, and said access means and said water flow means being located sufficiently high on said container, for retaining a substantial volume of water for maintenance of live baitfish, when free standing on a horizontal surface, and while said access means is open for insertion and removal of baitfish; and
   said handle means further providing carrying means, attached at or above the center of gravity of said device, for carrying said container in upright position when loaded with water and baitfish, for use of said device as a minnow bucket, without modification, adapters or auxiliary equipment.

6. A lighted submersible fish attracting device according to claim 3, wherein;
   said lighting means and said powercord comprise a detachable and separately operable and portable light assembly; and
   said handle means further includes means for handling and aiming said light assembly as a hand held utility light.

7. A lighted submersible fish attracting device according to claim 6, further comprising;
   said light assembly having flotation materials of size and buoyancy to cause said light assembly to float in water; and
   said flotation materials being attached in position to cause said light assembly to float in the upright position, with said lighting means directed downwardly, for use of said light assembly as a floating light for fishing, camping or utility purposes.

8. A light submersible fish attracting device with combined direct lighting and oppositely located, reflective floodlighting, comprising:
   (a) a transparent submersible container substantially closed for holding live bait;
   (b) said container having upper and lower portions, access means for inserting and removing bait, and water float means of size and shape for exit and entry of water while preventing the escape of live bait;
   (c) lighting means attached to said container for illuminating the bait and interior of said container;
   (d) electric powercord connected to said lighting means and connectable to an external power source;
   (e) handle means attached to said upper portion for lifting, handling, and carrying said device; and
   (f) means for combined direct lighting of the baitfish and oppositely located, reflective floodlighting of the baitfish and surrounding area, comprising:
      reflective means for reflectively floodlighting the baitfish and surrounding area;
      said reflective means being located separately, some distance apart from, and substantially opposing said lighting means;
      said reflective means being made of brightly reflective material, such as polished aluminum, mirrored glass, brightly painted surfaces, stainless steel or other brightly reflective materials; and
      said lighting means being directed onto and through the baitfish and onto said opposingly located reflective means.

9. A lighted submersible fish attracting device according to claim 8, further comprising;
   support means for stable, free standing support of said device in an upright position on a horizontal surface when loaded with water and baitfish;
   said lower portion of said container being substantially closed, and said access means and said water flow means being located sufficiently high on said container, for retaining a substantial volume of water for maintenance of live baitfish, when free standing on a horizontal surface, and while said access means is open for insertion and removal of baitfish; and
   said handle means further providing carrying means, attached at or above the center of gravity of said device, for carrying said container in upright position when loaded with water and baitfish, for use of said device as a minnow bucket, without modification, adapters or auxiliary equipment.

10. A lighted submersible fish attracting device according to claim 8, wherein;
    said lighting means and said powercord comprise a detachable and separately operable and portable light assembly; and
    said handle means further includes means for handling and aiming said light assembly as a hand held utility light.

11. A lighted submersible fish attracting device according to claim 10, further comprising;
    said light assembly having flotation materials of size and buoyancy to cause said light assembly to float in water; and
    said flotation materials being attached in position to cause said light assembly to float in the upright position, with said lighting means directed downwardly, for use of said light assembly as a floating light for fishing, camping or utility purposes.

* * * * *